United States Patent
Li

(10) Patent No.: US 12,308,971 B2
(45) Date of Patent: May 20, 2025

(54) HARQ-ACK INFORMATION TRANSMISSION METHOD AND APPARATUS, AND COMMUNICATION DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 393 days.

(21) Appl. No.: 17/779,089

(22) PCT Filed: Nov. 22, 2019

(86) PCT No.: PCT/CN2019/120409
§ 371 (c)(1),
(2) Date: May 23, 2022

(87) PCT Pub. No.: WO2021/097846
PCT Pub. Date: May 27, 2021

(65) Prior Publication Data
US 2022/0416951 A1  Dec. 29, 2022

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1854* (2013.01); *H04L 1/1858* (2013.01); *H04L 1/1896* (2013.01); *H04L 5/0055* (2013.01)

(58) Field of Classification Search
CPC ... H04L 1/1812; H04L 1/1854; H04L 1/1858; H04L 1/1896; H04L 5/0055
See application file for complete search history.

(56) References Cited

U.S. PATENT DOCUMENTS 11,239,978 B2 * 2/2022 Liang ............... H04L 1/1854
11,381,346 B2 * 7/2022 Islam ............... H04W 72/21
(Continued)

FOREIGN PATENT DOCUMENTS

CN   108880762 A   11/2018

OTHER PUBLICATIONS

International Search Report of PCT/CN2019/120409 dated Aug. 10, 2020 with English translation, (4p).
(Continued)

*Primary Examiner* — Chandrahas B Patel
(74) *Attorney, Agent, or Firm* — Arch & Lake LLP; Hao Tan; Shen Wang

(57) ABSTRACT

Disclosed in the present disclosure are an HARQ-ACK information transmission method and apparatus, and a communication device. The HARQ-ACK information transmission method comprises: when a one shot HARQ-ACK feedback mechanism is configured for user equipment (UE), issuing high-level signaling comprising a predetermined information domain; and on the basis of the number of transmissions N carried by the predetermined information domain, receiving same HARQ-ACK information for N times on N feedback occasions corresponding to the one shot HARQ-ACK feedback mechanism, wherein N is a positive integer.

18 Claims, 8 Drawing Sheets

(51) Int. Cl.
*H04L 1/1867* (2023.01)
*H04L 5/00* (2006.01)

(56) References Cited

U.S. PATENT DOCUMENTS

| | | | | |
|---|---|---|---|---|
| 11,646,834 B2 * | 5/2023 | Wang | ................... | H04L 5/0007 370/329 |
| 2019/0074935 A1 | 3/2019 | Babaei et al. | | |
| 2022/0330298 A1 * | 10/2022 | Cheng | ................... | H04W 72/23 |

OTHER PUBLICATIONS

AT&T, "HARQ Enhancements to URLLC" 3GPP TSG RAN WG1 Meeting, #95, R1-1812856, Spokane, WA, Nov. 12-16, 2018, (6p).

Xiaomi, "Discussion on HARQ enhancement for NR-U" 3GPP TSG RAN WG1 #99, R1-19111992, Reno, NV, Nov. 18-22, 2019, (3p).

CNOA of Application No. 201980003136.9 dated on Jun. 2, 2022 with English translation, (12p).

Nokia, Nokia Shanghai Bell "Summary of [91-LTE-10] Email discussion on candidate techniques for LTE URLLC" 3GPP TSG RAN WG1 Meeting #92, R1-1801864, Athens, Greece, Feb. 26-Mar. 2, 2017, (26p).

Xiaomi. "Discussion on HARQ enhancement for NR-U" 3GPP TSG RAN WG1 #99, R1-1911992, Reno, USA, Nov. 18-22, 2019,(3p).

* cited by examiner

HARQ-ACK INFORMATION TRANSMISSION METHOD AND APPARATUS, AND COMMUNICATION DEVICE

CROSS REFERENCE TO RELATED APPLICATION

The present application is a U.S. national phase application of PCT International Application No. PCT/CN2019/120409 filed on Nov. 22, 2019, the entire content of which is incorporated herein by reference in its entirety for all purposes.

TECHNICAL FIELD

The present disclosure relates to the field of wireless communication, but are not limited to the field of wireless communication, and in particular, relate to a hybrid automatic repeat request-acknowledgement (HARQ-ACK) information transmission method and apparatus, and a communication device.

BACKGROUND

In the 5th Generation (5G) New Radio (NR), when the base station schedules a Physical Downlink Shared Channel (PDSCH) resource (i.e., communication resource configured as PDSCH), it needs to indicate, for the data transmitted by the PDSCH resource, the corresponding transmission resource of HARQ-ACK information.

A one-shot HARQ-ACK feedback mechanism is proposed in the 5G NR Unlicensed Channel (i.e., NR-Unlicense, NR-U), which is configured to feed back the HARQ-ACK information of all HARQ processes at one time. If the base station configures a one-shot HARQ-ACK feedback mechanism for the user equipment (UE), then each time the UE feeds back the HARQ-ACK information, it needs to feed back the HARQ-ACK information of all HARQ processes (regardless of the PDSCH resource corresponding to the HARQ-ACK process is scheduled or not) at one time.

However, due to the large interference on the unlicensed channel, the user equipment (UE) may be disturbed when transmitting the HARQ-ACK information, resulting in errors. At this time, unnecessary retransmissions or transmission errors such as large retransmission delays may occur.

SUMMARY

The present disclosure provides a HARQ-ACK transmission method and apparatus, and a communication device.

A first aspect of the present disclosure provides a hybrid automatic repeat request-acknowledge HARQ-ACK information transmission method, which is applied to a base station. The method includes: receiving high-level signaling including a predetermined information field that is sent when the one-shot HARQ-ACK feedback mechanism is configured by the base state for a UE; and receiving the same HARQ-ACK information for N times on N feedback occasions corresponding to the one-shot HARQ-ACK feedback mechanism, based on the number N of transmissions carried in the predetermined information field, where N is a positive integer.

A second aspect of the present disclosure provides a HARQ-ACK information transmission method, which is applied to user equipment (UE). The method includes: receiving high-layer signaling including a predetermined information field, when the base station configures the UE to use a one-shot HARQ-ACK feedback mechanism; and send the same HARQ-ACK information for N times on N feedback occasions corresponding to the one-shot HARQ-ACK feedback mechanism, based on the number N of transmissions carried by the predetermined information field, where N is a positive integer.

A third aspect of embodiments of the present disclosure provides a communication device, including: a transceiver; a memory; and a processor, which is respectively connected to the transceiver and the memory. The processor is configured to control the transceiver to send and receive a signal wirelessly by executing computer-executable instructions stored in the memory, and to implement the HARQ-ACK transmission method provided by any technical solution of the first aspect or the second aspect.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. The implementations described in the following exemplary embodiments are not intended to represent all implementations consistent with embodiments of the present disclosure. Rather, they are merely examples of apparatus and methods consistent with some aspects of embodiments of the present disclosure, as recited in the appended claims.

The terms used in embodiments of the present disclosure are only for the purpose of describing particular embodiments, and are not intended to limit embodiments of the present disclosure. As used in embodiments of the present disclosure and the appended claims, the singular forms "a" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, without departing from the scope of embodiments of the present disclosure, the first information may also be referred to as the second information, and similarly, the second information may also be referred to as the first information. Depending on the context, the word "if" as used herein may be interpreted as "at the time of" or "when" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
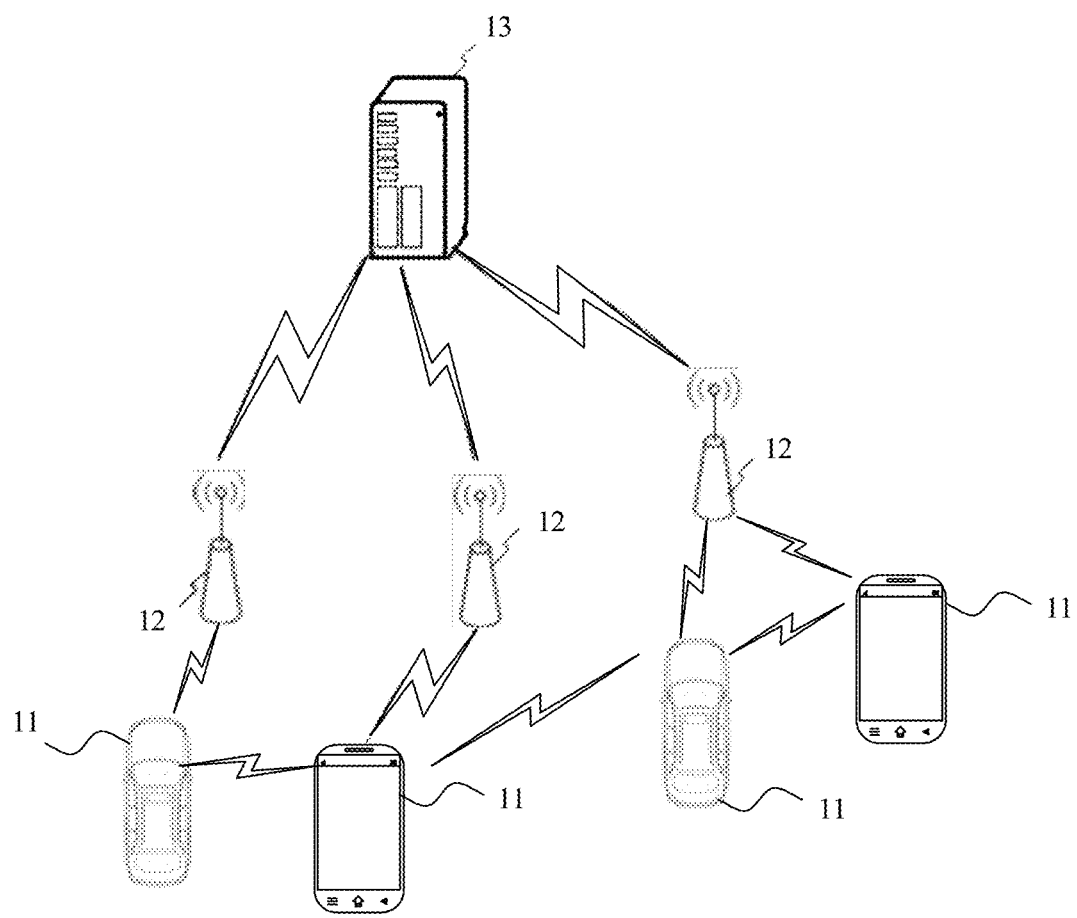
FIG. 1 is a schematic structural diagram of a wireless communication system according to an example of the present disclosure.

Reference may be made to FIG. 1, which shows a schematic structural diagram of a wireless communication system provided by an example of the present disclosure. As shown in FIG. 1, the wireless communication system is a communication system based on cellular mobile communication technology, and the wireless communication system may include: several UEs 11 and several base stations 12.

The UE 11 may be a device that provides voice and/or data connectivity to the user. The UE 11 may communicate with one or more core networks via a Radio Access Network (RAN). The UE 11 may be an IoT UE such as a sensor device, a mobile phone (or "cellular" phone) and a computer having an IoT-enabled UE. For example, the UE may be a stationary, portable, pocket-sized, hand-held, computer-built-in, or vehicle-mounted device. For example, station (STA), subscriber unit, subscriber station, mobile station, mobile terminal, remote station, access point, remote UE (Remote terminal), access UE (access terminal), user equipment (user terminal), user agent (user agent), user equipment (user device), or user UE (user equipment, UE). Alternatively, the UE 11 may also be a device of an unmanned aerial vehicle. Alternatively, the UE 11 may also be an in-vehicle device, for example, a trip computer with a wireless communication function, or a wireless communication device connected to an external trip computer. Alternatively, the UE 11 may also be a roadside device. For example, it may be a streetlight, a signal light, or other roadside device having a wireless communication function.

The base station 12 may be a network-side device in a wireless communication system. The wireless communication system may be a 5G system, also known as a new radio (NR) system or a 5G NR system. Alternatively, the wireless communication system may be a system supporting New Radio Unlicensed Spectrum Communication (NR-U, New Radio-Unlicense). Alternatively, the wireless communication system may be a next-generation system of the 5G system. The access network in the 5G system may be called New Generation-Radio Access Network (NG-RAN).

The base station 12 may be a base station (gNB) that adopts a centralized distributed architecture in the 5G system. When the base station 12 adopts a centralized distributed architecture, it usually includes a central unit (CU) and at least two distributed units (DU). The central unit is provided with a protocol stack of a Packet Data Convergence Protocol (PDCP) layer, a Radio Link Control (RLC) layer, and a Medium Access Control (MAC) layer. The distributed unit is provided with a physical (PHY) layer protocol stack. Specific implementations of the base station 12 are not limited in an example of the present disclosure.

A wireless connection may be established between the base station 12 and the UE 11 through a wireless air interface. In different examples, the wireless air interface is a wireless air interface based on the fifth generation mobile communication network technology (5G) standard. For example, the wireless air interface is a new radio. Alternatively, the wireless air interface may also be a 5G-based wireless air interface of the next-generation mobile communication network technology standard.

In some examples, an End to End (E2E) connection may also be established between the UEs 11. In some examples, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a Home Subscriber Server (HSS), etc. Implementations of the network management device 13 are not limited in an example of the present disclosure.

Figure 2:
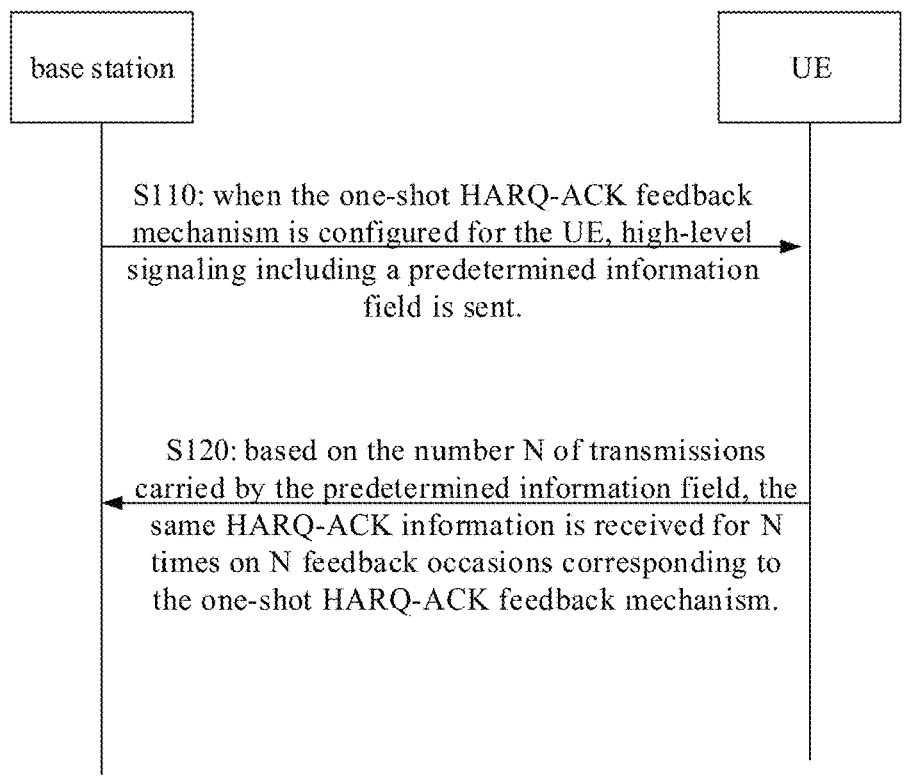
FIG. 2 is a schematic flowchart of a HARQ-ACK transmission method according to an example of the present disclosure.

As shown in FIG. 2, an example provides a HARQ-ACK information transmission method, which is applied to a base station. The method includes the following steps S110 and S120.

In step S110, when the one-shot HARQ-ACK feedback mechanism is configured for the UE, high-level signaling including a predetermined information field is sent.

In step S120, based on the number N of transmissions carried by the predetermined information field, the same HARQ-ACK information is received for N times on N feedback occasions corresponding to the one-shot HARQ-ACK feedback mechanism, where N is a positive integer.

The HARQ-ACK information provided in an example may be feedback information transmitted by using an unlicensed channel, or feedback information transmitted by using a licensed channel.

The high-layer signaling may be signaling of any layer above the physical layer. In an example of the present application, the high-layer signaling includes but is not limited to: MAC layer signaling and/or radio resource control (RRC) signaling. By adopting the MAC layer signaling to carry the activation signaling or the deactivation signaling, the base station has greater flexibility in signaling.

The predetermined information field may carry the number N of times of the HARQ-ACK information transmission. N may be a positive integer. Specifically, if it is determined that the interference of the current unlicensed channel is large, N is set to be larger, and if it is determined that the interference of the current unlicensed channel is small, N is set to be smaller.

For example, when the interference signal strength of the Physical Uplink Control Channel (PUCCH) is greater than or equal to an interference threshold, the value of N is a positive integer greater than or equal to 2. When the interference strength of the PUCCH channel is less than the interference threshold, the value of N may be 1. If N is 1, it means that the HARQ-ACK information triggered by the one-shot HARQ-ACK feedback mechanism does not need to be retransmitted. The PUCCH channel here may be an unlicensed channel or a licensed channel.

When N is greater than or equal to 2, the value of N may be selected from 3 to 10 times, or from 2 to 3 times, or from 2 to 4 times. The value range of N is a positive integer between 2 and 4 or between 2 and 3. On the one hand, the repeated transmission of the same HARQ-ACK information is realized, and on the other hand, unnecessary transmission caused by more than 4 transmissions is reduced. This helps to reduce the unnecessary bit overhead generated by the HARQ-ACK information transmission.

If the one-shot HARQ-ACK feedback mechanism is used to transmit the HARQ-ACK information, the UE will transmit the HARQ-ACK information corresponding to all HARQ processes to the base station at one time. For example, if the number of HARQ processes is 16, and a one-shot HARQ-ACK is used to transmit the HARQ-ACK information, the UE will send the HARQ-ACK information of 16 HARQ processes to the base station at one time, and the base station will receive the 16 copies of the HARQ-ACK information reported by the UE at one time. For example, if the number of HARQ processes is 8, and a one-shot HARQ-ACK is used to transmit HARQ-ACK, the UE will send the HARQ-ACK information of 8 HARQ processes to the base station at one time, and the base station will receive the 8 copies of the HARQ-ACK information reported by the UE at one time.

The HARQ-ACK information may include ACK and NACK. ACK indicates successful data reception, and NACK indicates data reception failure.

In this way, when the HARQ-ACK information transmission fails for the first time, and the HARQ-ACK information transmission is successful at any time from the 2nd time to the N-th time, the base station may successfully receive the HARQ-ACK information uploaded by the UE. This helps to reduce the phenomenon of data transmission errors caused by a single transmission failure of the HARQ-ACK information.

One transmission of the HARQ-ACK information to be transmitted for N times is performed at one of the feedback occasions. In this way, the HARQ-ACK information is transmitted once for each of the N feedback occasions. If the N feedback occasions are separated in the time domain, the N transmissions of the same HARQ-ACK information are separated in the time domain. Compared with the centralized transmission in the time domain, the phenomenon where all the N times of transmission fail due to large interference in a single time period is reduced, thereby improving the transmission success rate for one piece of HARQ-ACK information.

The feedback occasion corresponding to the one-shot HARQ-ACK feedback mechanism may be determined according to the information carried by the downlink control information (DCI) scheduling PDSCH.

One such feedback occasion may be one PUCCH resource. One of the PUCCH resources may transmit the HARQ-ACK information once.

In some examples, the method further includes: sending an activation indication when it is determined to activate a repeated transmission of the HARQ-ACK information, where the activation indication is configured to trigger the UE to send the same HARQ-ACK information for N times based on the number of transmissions; and sending a deactivation indication when it is determined to deactivate the repeated transmission of the HARQ-ACK information, where the deactivation indication is configured to trigger the UE to send one piece of HARQ-ACK information once.

Figure 3A:
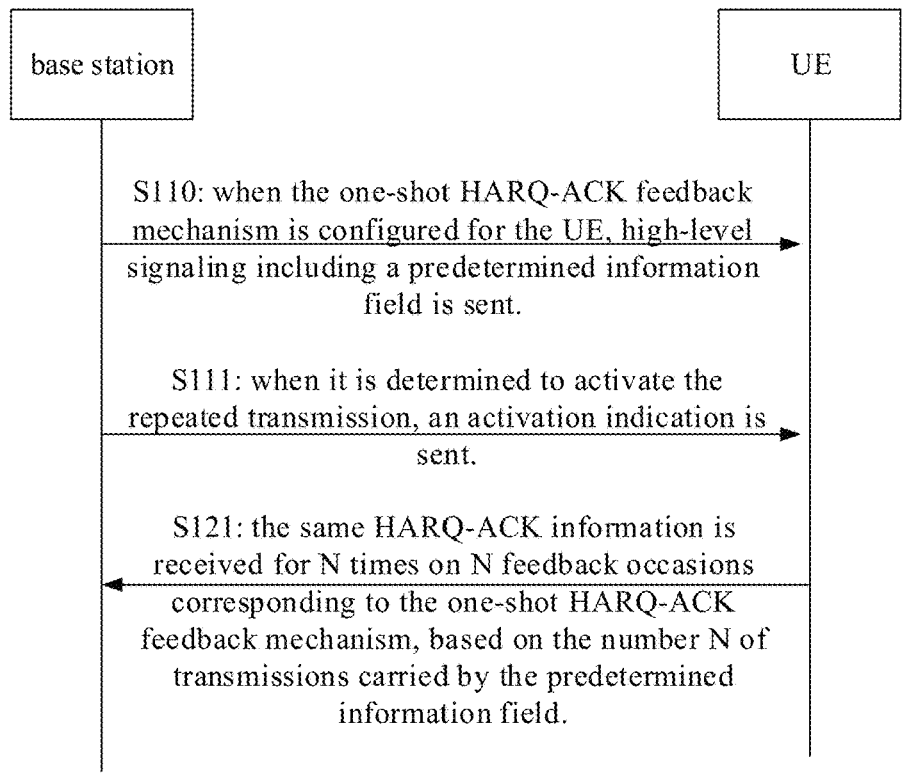
FIG. 3A is a schematic flowchart of a HARQ-ACK transmission method according to an example of the present disclosure.

As shown in FIG. 3A, the method further includes the following step S111.

In step S111, when it is determined to activate the repeated transmission of the HARQ-ACK information, an activation indication is sent.

The step S120 may further include sub-steps S121 and S121.

After the repeated transmission of the HARQ-ACK information is activated by the activation indication, the same HARQ-ACK information is received for N times on N feedback occasions corresponding to the one-shot HARQ-ACK feedback mechanism, based on the number N of transmissions carried by the predetermined information field.

In some examples, if N is greater than or equal to 2, the HARQ-ACK information will be repeatedly transmitted. If N is greater than or equal to 2, the base station determines that repeated transmission of the HARQ-ACK information needs to be activated, and then sends an activation indication. After receiving the activation indication, the UE transmits for N times the same HARQ-ACK information generated based on the one-shot HARQ-ACK feedback mechanism.

In other examples, if N is equal to 1, it is equivalent to that one piece of HARQ-ACK information will only be transmitted once, and the repeated transmission may not be activated at this time. That is, the activation indication will not be sent.

If the activation indication is sent, the base station will receive the same HARQ-ACK information for N times on N feedback occasions corresponding to the one-shot HARQ-ACK feedback mechanism.

Figure 3B:
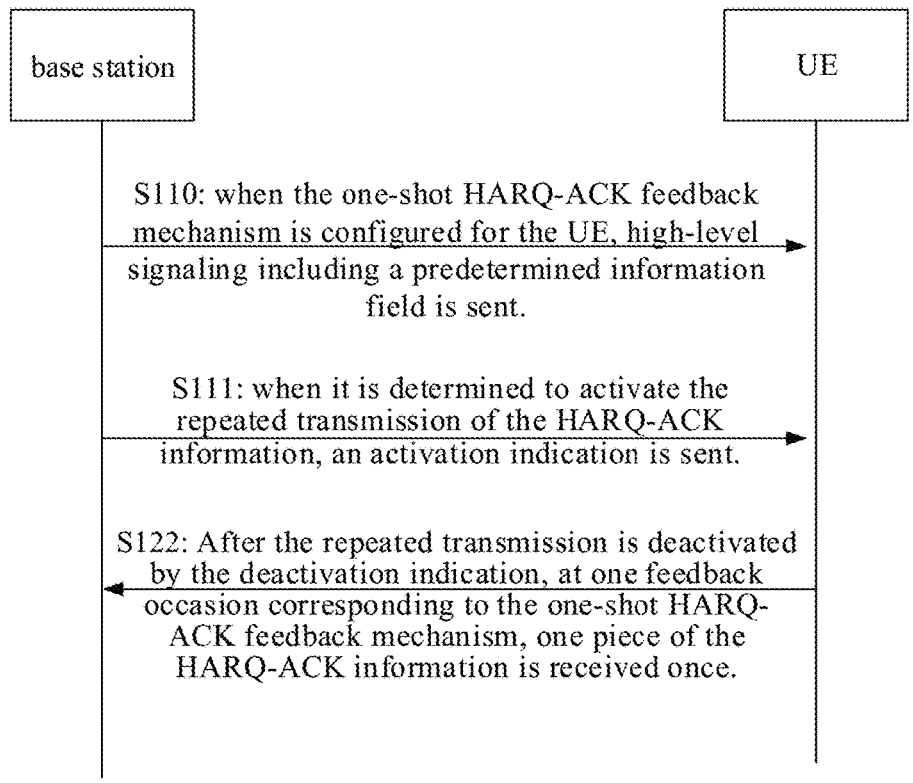
FIG. 3B is a schematic flowchart of a HARQ-ACK transmission method according to an example of the present disclosure.

As shown in FIG. 3B, the method further includes the following step S112.

In step S112, when it is determined to deactivate the repeated transmission of the HARQ-ACK information, a deactivation indication is sent. The deactivation indication is configured to instruct the UE to deactivate the repeated transmission of the HARQ-ACK information. That is, the deactivation indication is used to instruct the UE not to repeatedly transmit the HARQ-ACK information. For example, the activation indication is used to instruct the UE to perform N repeated transmissions of one piece of HARQ-ACK information. The deactivation indication is used to deactivate the N repeated transmissions of one piece of HARQ-ACK information as activated. In some examples, after the UE receives the deactivation indication, it will not repeatedly transmit one piece of HARQ-ACK information according to N, but will still transmit one piece of HARQ-ACK information once.

The step S120 may further include sub-steps S122 and S122. After the repeated transmission is deactivated by the deactivation indication, at one feedback occasion corresponding to the one-shot HARQ-ACK feedback mechanism, one piece of the HARQ-ACK information is received once.

In some examples, the step S111 may include: sending the activation indication or the deactivation indication through medium access control MAC layer signaling.

In an example of the present application, the activation indication may be carried in MAC signaling. For example, the activation indication may be carried in a MAC control element (CE).

In other examples, an information field may be set in physical layer signaling (such as downlink control information) and/or MAC signaling to carry the activation indication. The specific bit value of the information field is considered as carrying the activation indication. When a bit value other than the specific bit value is carried, it may be considered that the activation indication has not been sent or that the base station has sent the deactivation indication. The deactivation indication here is to indicate that the same HARQ-ACK information does not need to be transmitted for N times. For example, it only needs to be transmitted once.

In some examples, the HARQ-ACK codebook carrying the HARQ-ACK information includes N sub-codebooks. One of the sub-codebooks carries one piece of the HARQ-ACK information.

Figure 4A:
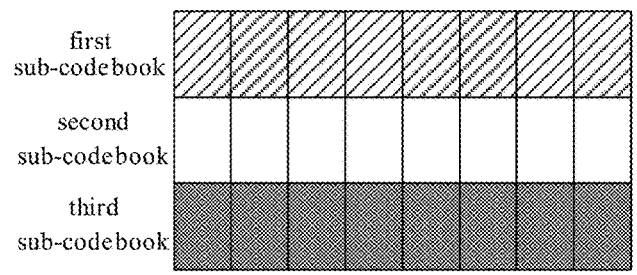
FIG. 4A is a schematic diagram of a HARQ-ACK codebook provided by an example of the present disclosure.
Figure 4B:
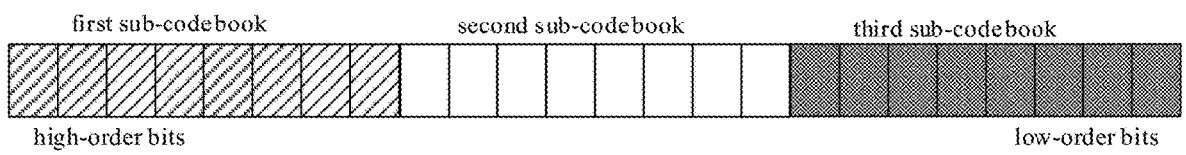
FIG. 4B is a schematic diagram of another HARQ-ACK codebook provided by an example of the present disclosure

FIG. 4A and FIG. 4B are one of the HARQ-ACK codebooks. When N is equal to 3, one of the HARQ-ACK codebooks includes 3 sub-codebooks. One sub-codebook may be used to carry HARQ-ACK for all HARQ processes triggered by the one-shot HARQ-ACK feedback mechanism. One sub-codebook contains 8 bits in FIGS. 4A and 4B.

In FIG. 4A, in order to distinguish different sub-codebooks, the sub-codebooks are shown in a concatenated way. The arrangement of each bit in the HARQ-ACK codebook may be as shown in FIG. 4B. In FIG. 4B, the bits on the left side of the HARQ-ACK codebook are high-order bits, and the bits on the right side are low-order bits. It can be seen that the bits occupied by the first sub-codebook are located before the bits occupied by the second sub-codebook and the third sub-codebook.

For example, if there are S HARQ processes, one piece of HARQ-ACK information includes HARQ-ACK of the S HARQ processes. If the HARQ-ACK of one HARQ process consumes 1 bit to indicate transmission success or failure, then one piece of HARQ-ACK information needs S bits, and one sub-codebook in the HARQ-ACK codebook contains at least S bits.

In some examples, the sub-codebooks may be sequenced from the high-order bits to the low-order bits of the HARQ-ACK codebook, or from the low-order bits to the high-order bits of the HARQ-ACK codebook.

Figure 5:
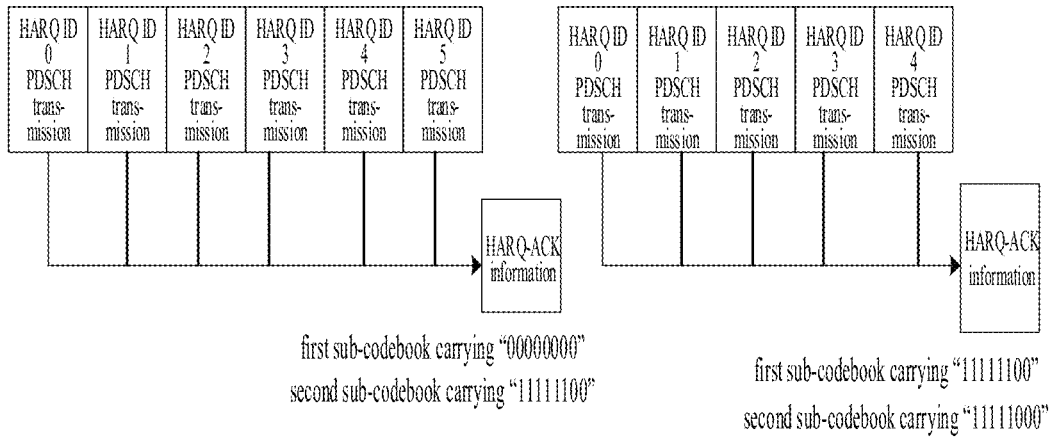
FIG. 5 is a schematic flowchart of a HARQ-ACK transmission method according to an example of the present disclosure.

For example, as shown in FIG. 5, when the HARQ-ACK codebook is sequenced from the high-order bits to the low-order bits, the bits in the HARQ-ACK codebook occupied by the first sub-codebook are the high-order bits in the HARQ-ACK code occupied by the second sub-codebook. For example, a 16-bit HARQ-ACK codebook with N=2 currently carries a bit value of "0000000011110000", where "00000000" is the high-order bit as compared with "11110000". "00000000" and "11110000" respectively correspond to the two sub-codebooks in the HARQ-ACK codebook. Besides, "00000000" is carried by the first sub-codebook, and "11110000" is carried by the second sub-codebook.

In some examples, one piece of HARQ-ACK information is carried by the (N+1−X)-th sub-codebook of the HARQ-ACK codebook during the X-th transmission, where X is a positive integer less than or equal to N.

If one piece of HARQ-ACK information is transmitted for the X-th time, and is carried by the (N+1−X)-th sub-codebook of the currently transmitted HARQ-ACK codebook, the first transmission of one piece of HARQ-ACK information is carried by the last sub-codebook of the HARQ-ACK codebook, and the last transmission of one piece of HARQ-ACK information is transmitted by the first sub-codebook of the HARQ-ACK codebook.

In an example of the present application, when the sub-codebooks in the HARQ-ACK codebook may be sequenced from the high-order bits to the low-order bits, and one piece of HARQ-ACK information is transmitted for the X-th time in the transmission mode carried by the (N+1−X)-th sub-codebook of the currently transmitted HARQ-ACK codebook, the HARQ-ACK information not transmitted for the first time is carried in the high-order bits in one HARQ-ACK codebook. If the high-order bits are transmitted first, the base station will first receive the HARQ-ACK information that is not transmitted for the first time. In combination with the previous transmission, the HARQ-ACK information which is transmitted online may be decoded faster, thereby reducing the demodulation delay of the feedback information for the previously scheduled HARQ-ACK information and realizing retransmission as soon as possible.

When the transmission is just started, there may be a situation that the number of feedback occasions triggered by the current one-shot HARQ-ACK feedback mechanism is less than N, and the total number of copies of the HARQ-ACK information as formed is also less than N. At this time, some sub-codebooks in a HARQ-ACK codebook have no HARQ-ACK information available for carrying. In an example of the present application, this part of sub-codebooks may carry a predetermined bit sequence. The predetermined bit sequence may be an all "1" sequence, an all "0" sequence, or a combined sequence of "0" and "1" formed in a predetermined combining pattern. For example, taking an 8-bit sub-codebook as an example, the predetermined bit sequence may be any one of the following: "00000000", "11111111", "11000011", "10101010", "11001100", and "10000001".

In short, when the PDSCH transmission is initiated, and the number Y of copies of the HARQ-ACK information to be sent is less than N, the 1st to the (N−Y)-th sub-codebooks in the HARQ-ACK codebook carry a predetermined bit sequence.

As shown in FIG. 5, one HARQ-ACK codebook includes two sub-codebooks, and the two sub-codebooks are the first sub-codebook and the second sub-codebook respectively.

When the HARQ-ACK information is initially transmitted, there may be only one piece of HARQ-ACK information generated by one feedback occasion corresponding to the one-shot HARQ-ACK feedback mechanism. The HARQ-ACK information is "11111100", where "11111100" is carried in the second sub-codebook of the HARQ-ACK codebook, and the first sub-codebook vacated carries an all "0" sequence. When the second piece of HARQ-ACK information has been generated, the first piece of HARQ-ACK information is carried in the first sub-codebook of the HARQ-ACK codebook, and the second piece of HARQ-ACK information as generated is carried in the second sub-codebook. At this time, the content carried in the first sub-codebook of the HARQ-ACK codebook is "11111100", and the content carried in the second sub-codebook is "11111000".

In some examples, the sub-codebook where the n-th piece of HARQ-ACK information is located in the HARQ-ACK codebook is arranged before the sub-codebook where the (n+1)-th piece of HARQ-ACK information is located, where n is a positive integer.

In an implementation of the present application, the sub-codebook where the n-th piece of HARQ-ACK information is located is arranged before the sub-codebook where the (n+1)-th piece of HARQ-ACK information is located. That is, the sub-codebook where the n-th piece of HARQ-ACK information is located is located is arranged in the high-order bits of the HARQ-ACK codebook, and the sub-codebook where the n-th piece of HARQ-ACK information is located is arranged in the low-order bits of the HARQ-ACK codebook.

In some examples, the number of bits included in the HARQ-ACK codebook is: $N*N_{ID}*BofPerID$, where $N_{ID}$ is the number of HARQ processes; BofPerID is the number of bits occupied by the HARQ-ACK information of one of the HARQ processes; and the number of bits of one of the sub-codebooks is $N_{ID}*BofPerID$.

In some examples, one HARQ process may correspond to one or more HARQ-ACKs. For example, if one HARQ process is allocated to one TB, one feedback is performed according to the completion of transmission of one TB, and one TB corresponds to one HARQ-ACK, the HARQ-ACK corresponding to one HARQ process only occupies one bit.

One TB may include multiple code blocks (CB), and multiple CBs may form a code block group (CBG), so that one TB includes multiple CBGs. If one CBG corresponds to one HARQ-ACK, the number of bits occupied by one HARQ process is equal to or greater than 2.

The number of bits of one sub-codebook is $N_{ID}*BofPerID$. That is, the number of bits consumed by one piece of HARQ-ACK information is $N_{ID}*BofPerID$.

In some examples, the method further includes: receiving one piece of HARQ-ACK information once at a feedback occasion corresponding to the one-shot HARQ-ACK feedback mechanism, when the predetermined information field does not carry the number of transmissions.

If the predetermined information field of the high-layer signaling does not carry the number of transmissions, the base station and the UE default that one piece of HARQ-ACK information is transmitted only once.

In some examples, the predetermined information field may include two parts, namely a first part and a second part. The first part is an indication bit, indicating whether the second part carries the number of transmissions. In this way, the predetermined information field may also be re-used to indicate other arbitrary information. Apparently, whether the predetermined information field carries the number of transmissions may also be indicated by indication bits in other information fields other than the predetermined information field.

Figure 6:
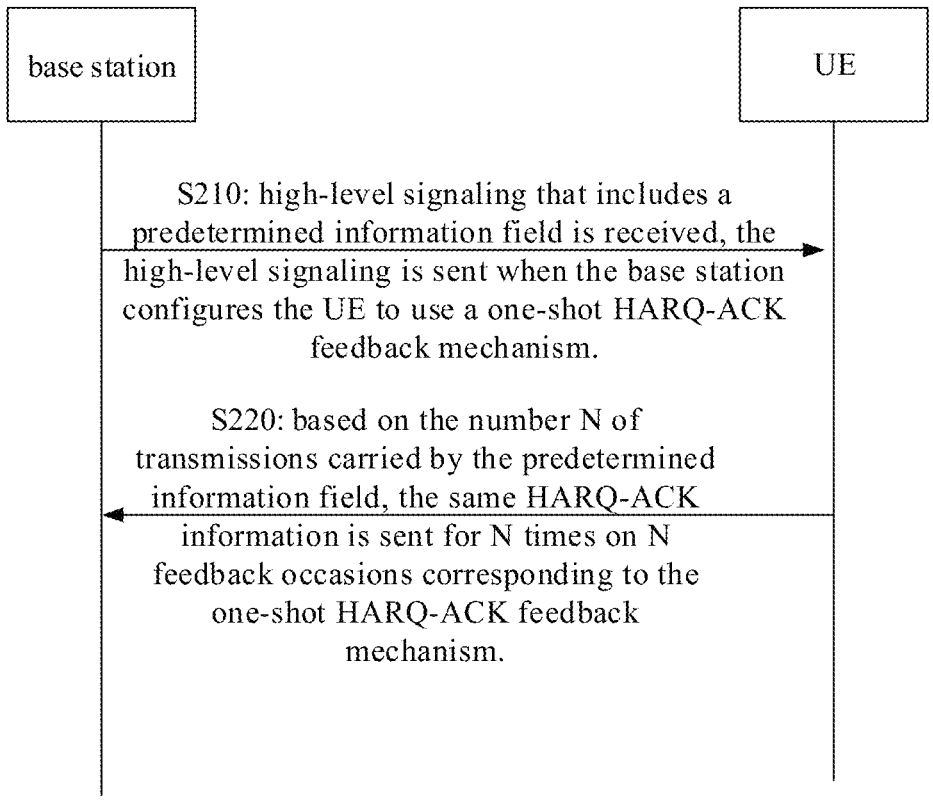
FIG. 6 is a schematic flowchart of a HARQ-ACK transmission method according to an example of the present disclosure.

As shown in FIG. 6, an example of the present disclosure provides a HARQ-ACK information transmission method, including the following steps S210 and S220.

In step S210, high-level signaling that includes a predetermined information field is received. The high-level signaling is sent when the base station configures the UE to use a one-shot HARQ-ACK feedback mechanism.

In step S220, based on the number N of transmissions carried by the predetermined information field, the same HARQ-ACK information is sent for N times on N feedback occasions corresponding to the one-shot HARQ-ACK feedback mechanism, where N is positive integer.

The HARQ-ACK information transmission method in an example of the present application may be applied to a UE. The UE includes, but is not limited to, a Machine Type Communication (MTC) device, an Internet of Things (IoT) device, or a conventional Long Term Evolution (LTE) device. The conventional LTE device here may include a mobile phone or a vehicle-mounted device, and the like.

When the base station configures the UE to use the one-shot HARQ-ACK feedback mechanism, the UE needs to receive high-layer signaling carrying a predetermined information field. The high-layer signaling includes but is not limited to RRC signaling and/or MAC layer signaling.

After receiving the high-level signaling carrying the predetermined information field, based on the number N of transmissions carried by the predetermined information field, one piece of HARQ-ACK information is sent for N times on N feedback occasions corresponding to the one-shot HARQ-ACK feedback mechanism.

Figure 7:
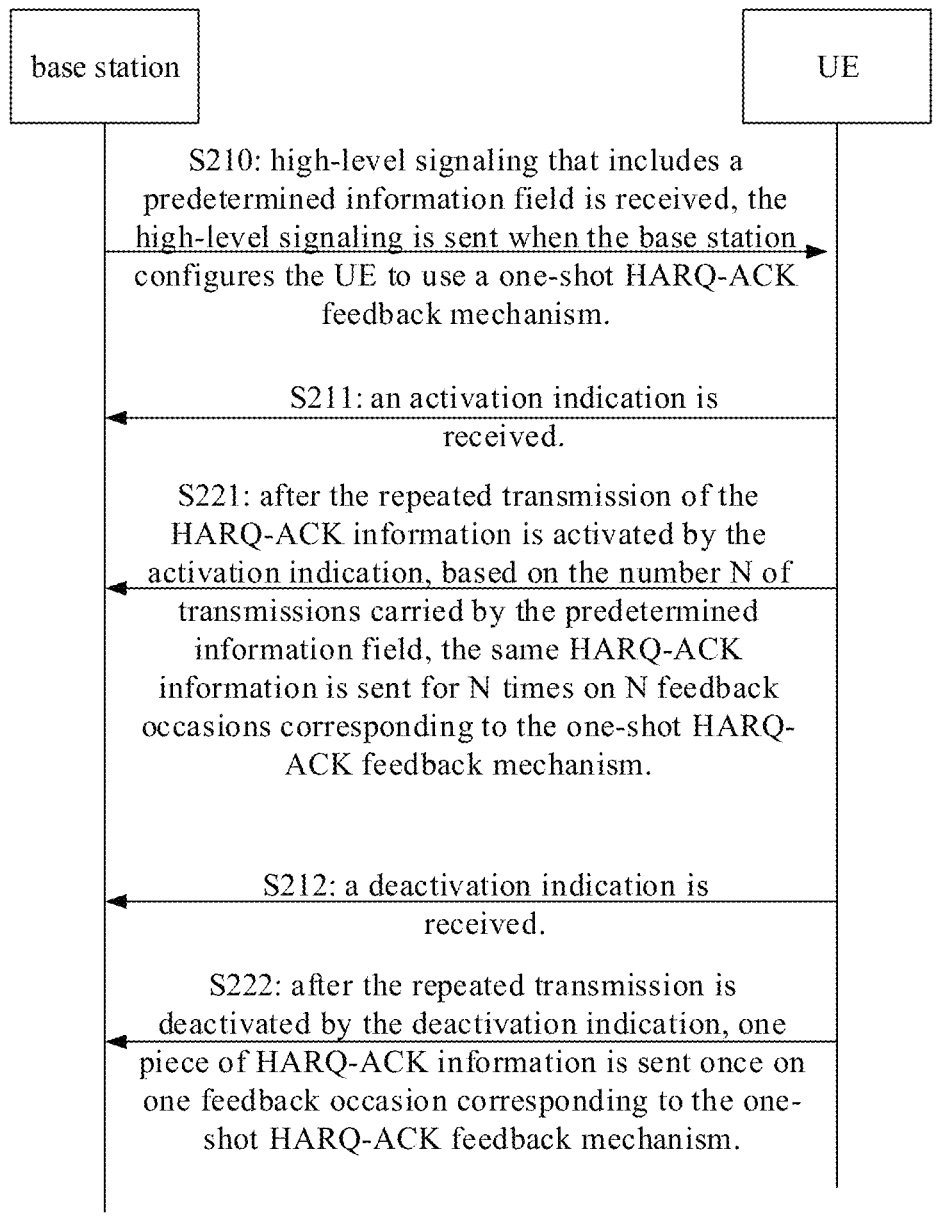
FIG. 7 is a schematic flowchart of a HARQ-ACK transmission method according to an example of the present disclosure.

In some examples, as shown in FIG. 7, the method further includes step S211, where an activation indication is received.

The step S220 may include sub-steps S221 and S221. After the repeated transmission of the HARQ-ACK information is activated by the activation indication, based on the number N of transmissions carried by the predetermined information field, the same HARQ-ACK information is sent for N times on N feedback occasions corresponding to the one-shot HARQ-ACK feedback mechanism.

Only when the repeated transmission of the HARQ-ACK information is activated, N times of transmission of the same HARQ-ACK information will be performed based on N.

In some examples, the method further includes the following step S212.

In step S212, a deactivation indication is received. The deactivation indication is used to instruct the UE to deactivate the repeated transmission of the HARQ-ACK information. For example, as shown in FIG. 7, the method further includes the following step S222.

In step S222, after the repeated transmission is deactivated by the deactivation indication, one piece of HARQ-ACK information is sent once on one feedback occasion corresponding to the one-shot HARQ-ACK feedback mechanism.

In some examples, the step S211 may include: acquiring the activation indication or the deactivation indication by receiving MAC layer signaling.

In some examples, the HARQ-ACK codebook carrying the HARQ-ACK information includes N sub-codebooks. One of the sub-codebooks carries one piece of HARQ-ACK information.

In some examples, the X-th transmission of one piece of HARQ-ACK information is carried by the (N+1−X)-th sub-codebook of the HARQ-ACK codebook, where X is a positive integer less than N.

In some examples, when the number Y of pieces of HARQ-ACK information to be sent is less than N, the first sub-codebook to the (N−Y)-th sub-codebook of the HARQ-ACK codebook carry a predetermined bit sequence.

In some examples, the sub-codebook where the n-th HARQ-ACK information is located in the HARQ-ACK codebook is positioned before the sub-codebook where the (n+1)-th HARQ-ACK information is located, where n is a positive integer.

In some examples, the number of bits included in the HARQ-ACK codebook is $N*N_{ID}*BofPerID$, where $N_{ID}$ is the number of HARQ processes; BofPerID is the number of bits occupied by the HARQ-ACK information of one of the HARQ processes; and the number of bits of one of the sub-codebooks is $N_{ID}*BofPerID$.

Figure 8:
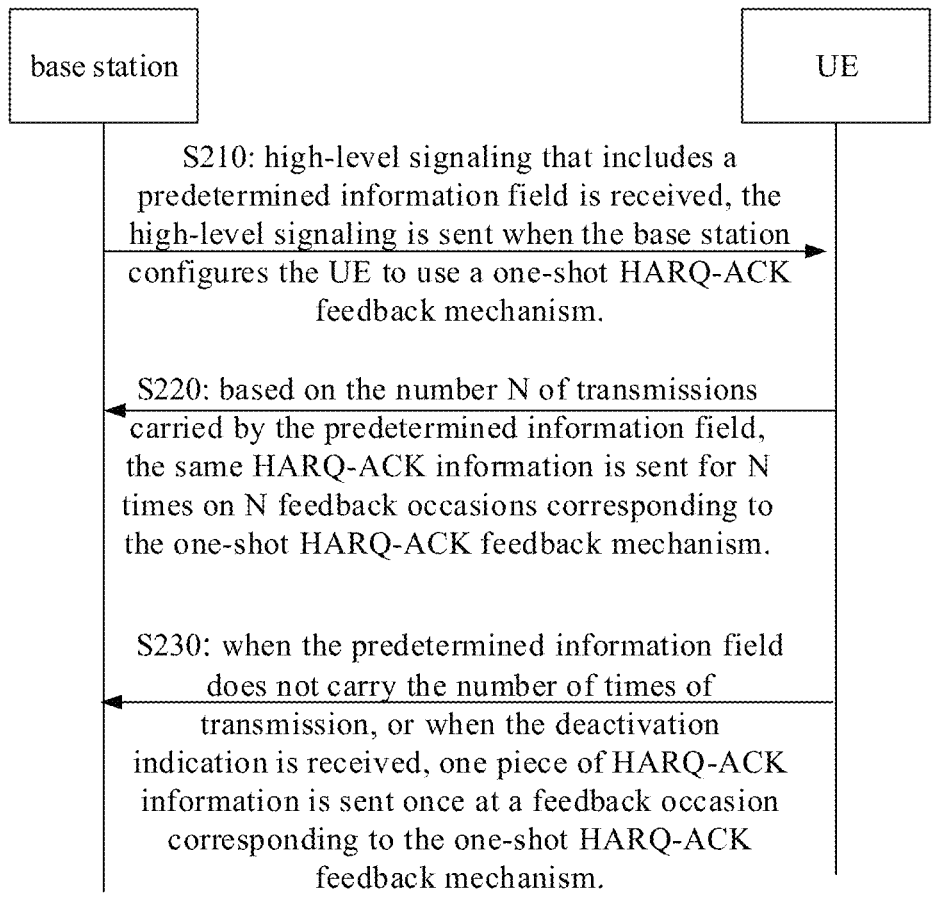
FIG. 8 is a schematic flowchart of a HARQ-ACK transmission method according to an example of the present disclosure.

As shown in FIG. 8, the method described in an example further includes the following step S230.

In step S230, when the predetermined information field does not carry the number of times of transmission, or when the deactivation indication is received, one piece of HARQ-ACK information is sent once at a feedback occasion corresponding to the one-shot HARQ-ACK feedback mechanism.

When the predetermined information field does not carry the number of transmissions or the deactivation indication is received, one piece of HARQ-ACK message may be sent once at a feedback occasion corresponding to the one-shot HARQ-ACK feedback mechanism. In this way, the base station will receive one piece of HARQ-ACK information once at one feedback occasion corresponding to the one-shot HARQ-ACK feedback mechanism.

If the UE has previously received the activation indication to activate repeated transmission of HARQ-ACK information, the base station may send a deactivation indication again, indicating that N is no longer used for repeated transmission of HARQ-ACK information.

The predetermined information field does not carrying the number of transmissions indicates one of the following situations:
all "0" bits are carried by the predetermined information field;
the predetermined information field does not contain a subfield carrying the number of transmissions; and
subfields in the predetermined information field indicating different subfield carrying contents indicate that the times of transmission are not carried.

In the latter two situations, the predetermined information field includes a plurality of subfields, and different subfields indicate different contents.

Figure 9:
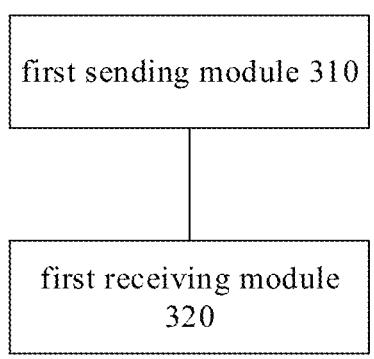
FIG. 9 is a schematic structural diagram of a HARQ-ACK processing apparatus according to an example of the present disclosure.

As shown in FIG. 9, an example of the present disclosure provides a HARQ-ACK information transmission apparatus, which is applied to a base station. The apparatus includes a first sending module 310 and a first receiving module 320.

The first sending module 310 is configured to send high-level signaling including a predetermined information field when the one-shot HARQ-ACK feedback mechanism is configured for the user equipment UE.

The first receiving module 320 is configured to receive the same HARQ-ACK information for N times on N feedback occasions corresponding to the one-shot HARQ-ACK feedback mechanism, based on the number N of transmissions carried by the predetermined information field, where N is a positive integer.

In some examples, the first sending module 310 and the first receiving module 320 may be program modules. After the program modules are executed by a processor, high-level signaling is sent and HARQ-ACK information is received.

In other examples, the first sending module 310 and the first receiving module 320 may be a combination of hardware and software modules. The combination of software and hardware modules includes but is not limited to programmable arrays. The programmable arrays include but are not limited to field programmable array or complex programmable array.

In still other examples, the first sending module 310 and the first receiving module 320 may include pure hardware modules. The pure hardware modules include but are not limited to application specific integrated circuits.

In some examples, the first sending module 310 is further configured to send an activation indication when it is determined to activate repeated transmission of HARQ-ACK information. The activation indication is used to trigger the UE to send the same HARQ-ACK information for N times based on the number of transmissions.

When it is determined to deactivate the repeated transmission of the HARQ-ACK information, a deactivation indication is sent. The deactivation indication is used to trigger the UE to send one piece of HARQ-ACK information for one time.

The first receiving module 320 is further configured to, after the repeated transmission of HARQ-ACK information is activated by the activation indication, receive the same HARQ-ACK information for N times on N feedback occasions corresponding to the one-shot HARQ-ACK feedback mechanism, based on the number N of transmissions carried by the predetermined information field.

In some examples, the first receiving module 320 is further configured to, when the deactivation indication of the repeated transmission has been sent, receive one piece of HARQ-ACK information once on a feedback occasion corresponding to the one-shot HARQ-ACK feedback mechanism.

In some examples, the first sending module 310 is configured to send the activation indication or the deactivation indication through medium access control MAC layer signaling.

In some examples, the HARQ-ACK codebook carrying the HARQ-ACK information includes N sub-codebooks. One of the sub-codebooks carries one piece of HARQ-ACK information.

In some examples, the X-th transmission of one piece of HARQ-ACK information is carried by the (N+1−X)-th sub-codebook of the HARQ-ACK codebook, where X is a positive integer less than or equal to N.

In some examples, when the number Y of pieces of HARQ-ACK information to be sent is less than N, the first sub-codebook to the (N−Y)-th sub-codebook of the HARQ-ACK codebook carry a predetermined bit sequence.

In some examples, the sub-codebook where the n-th HARQ-ACK information is located in the HARQ-ACK codebook is positioned before the sub-codebook where the (n+1)-th HARQ-ACK information is located, where n is a positive integer.

In some examples, the number of bits included in the HARQ-ACK codebook is $N*N_{ID}*BofPerID$, where $N_{ID}$ is the number of HARQ processes; BofPerID is the number of bits occupied by the HARQ-ACK information of one of the HARQ processes; and the number of bits of one of the sub-codebooks is $N_{ID}*BofPerID$.

In some examples, the first receiving module 320 is further configured to, when the predetermined information field does not carry the number of transmissions, receive one piece of HARQ-ACK information once on a feedback occasion corresponding to the one-shot HARQ-ACK feedback mechanism.

Figure 10:
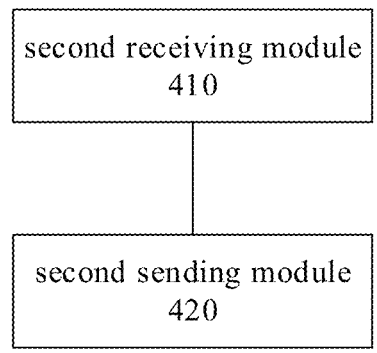
FIG. 10 is a schematic structural diagram of a HARQ-ACK processing apparatus according to an example of the present disclosure.

As shown in FIG. 10, an example of the present disclosure provides a HARQ-ACK information transmission apparatus, which is applied to a UE and includes a second receiving module 410 and a second sending module 420.

The second receiving module 410 is configured to receive the high-level signaling including the predetermined information field. The high-level signaling is sent when the base station configures the UE to use the one-shot HARQ-ACK feedback mechanism.

The second sending module 420 is configured to send the same HARQ-ACK information for N times on N feedback occasions corresponding to the one-shot HARQ-ACK feedback mechanism, based on the number N of transmissions carried by the predetermined information field, where N is a positive integer.

In some examples, the second sending module 420 and the second receiving module 410 may be program modules. After the program modules are executed by a processor, high-layer signaling is received and HARQ-ACK information is sent.

In other examples, the second sending module 420 and the second receiving module 410 may be a combination of hardware and software modules. The combination of software and hardware modules includes but is not limited to programmable arrays. The programmable arrays include but are not limited to field programmable array or complex programmable array.

In still other examples, the second sending module 420 and the second receiving module 410 may include pure hardware modules including but not limited to application specific integrated circuits.

In some examples, the second receiving module 410 is further configured to receive an activation indication.

The second sending module 420 is further configured to, after the repeated transmission of HARQ-ACK information is activated by the activation indication, send the same HARQ-ACK information for N times on N feedback occasions corresponding to the one-shot HARQ-ACK feedback mechanism, based on the number N of transmissions carried by the predetermined information field.

In other examples, the second receiving module 410 is further configured to receive a deactivation indication.

The second sending module 420 is further configured to, send one piece of HARQ-ACK information once on a feedback occasion corresponding to the one-shot HARQ-ACK feedback mechanism, when the deactivation indication is received.

In some examples, the second receiving module 410 is further configured to acquire the activation indication or the deactivation indication by receiving media access control MAC layer signaling.

In some examples, the HARQ-ACK codebook carrying the HARQ-ACK information includes N sub-codebooks. One of the sub-codebooks carries one piece of HARQ-ACK information.

In some examples, the X-th transmission of one piece of HARQ-ACK information is carried by the (N+1−X)-th sub-codebook of the HARQ-ACK codebook, where X is a positive integer less than N.

In some examples, when the number Y of copies of HARQ-ACK information to be sent is less than N, the first sub-codebook to the (N−Y)-th sub-codebook of the HARQ-ACK codebook carry a predetermined bit sequence.

In some examples, the sub-codebook where the n-th HARQ-ACK information is located in the HARQ-ACK codebook is positioned before the sub-codebook where the (n+1)-th HARQ-ACK information is located, where n is a positive integer.

In some examples, the number of bits included in the HARQ-ACK codebook is $N*N_{ID}*BofPerID$, where $N_{ID}$ is the number of HARQ processes; BofPerID is the number of bits occupied by the HARQ-ACK information of one of the HARQ processes; and the number of bits of one of the sub-codebooks is $N_{ID}*BofPerID$.

In some examples, when the predetermined information field does not carry the number of transmissions, one piece of HARQ-ACK information is sent once at a feedback occasion corresponding to the one-shot HARQ-ACK feedback mechanism.

Two specific examples are provided below in conjunction with any of the above-mentioned examples:

A first example is discussed as follows.

When the UE is configured to use the one-shot HARQ-ACK feedback mechanism to transmit HARQ-ACK information, the base station may also configure for the UE whether to repeatedly transmit HARQ-ACK information, or the number of times to repeatedly transmit HARQ-ACK information.

For example, the base station may perform uplink configuration in the following ways.

The base station configures the number of times of repeated transmission of HARQ-ACK information through RRC layer signaling.

When the number of transmissions is 0, it means that there is only the first transmission and no repeated transmission.

When the number of times is N which is not less than 2, it means that in addition to the first transmission, the HARQ-ACK information will be transmitted for N−1 times on the PUCCH resources corresponding to the subsequent N−1 feedback occasions respectively.

The base station configures the number of transmissions through RRC layer signaling, and activates and deactivates the repeated transmission of HARQ-ACK information through MAC layer signaling.

When the number of transmissions configured by the RRC layer is N, and the UE is activated by the MAC layer signaling to repeatedly transmit HARQ-ACK information, after the UE transmits HARQ-ACK for the first time, it will also transmit the same HARQ-ACK information for N−1 times on the PUCCH resources corresponding to the subsequent N−1 feedback occasions respectively.

If the UE is not activated by MAC layer signaling to repeatedly transmit HARQ-ACK information, or the UE is deactivated by MAC layer signaling from repeatedly transmitting HARQ-ACK information, the UE will only transmit HARQ-ACK information once, and the HARQ-ACK information will not be repeatedly transmitted.

If the UE does not receive the repeatedly transmitted RRC configuration signaling, the UE will only transmit the HARQ-ACK information once, and will not transmit the HARQ-ACK information repeatedly.

A second example is discussed as follows.

In the case of activating the HARQ-ACK information generated based on the one-shot HARQ-ACK feedback mechanism, it is assumed that the maximum number of downlink processes configured by the base station is 8, the UE is configured to use the one-shot HARQ-ACK feedback mechanism, and the number of repetitions is N=2. It is assumed that the PDSCH transmission of each downlink process corresponds to 1-bit HARQ-ACK.

Referring to FIG. 5, when the HARQ-ACK information is transmitted for the first time based on the one-shot HARQ-ACK feedback mechanism, since there is no PDSCH transmission before this, 8 bits in the HARQ-ACK feedback information corresponding to repeated HARQ-ACK information part are all NACK (represented by 0).

When the HARQ-ACK information is fed back for the second time, it is necessary to repeat the HARQ-ACK information of the first time and carry the HARQ-ACK information of the current time (i.e., the second time). The HARQ-ACK feedback of the second transmission includes the HARQ-ACK information of the previous group of PDSCH (from HARQ ID 0 to 5) (corresponding to the repeated HARQ-ACK in the figure), and also includes the HARQ-ACK information (corresponding to the current HARQ-ACK in the figure) of the current PDSCH (from HARQ ID 0 to 4).

In this way of repeatedly transmission of the HARQ-ACK information, the number of bits consumed by the UE to report the HARQ-ACK information once is equal to the number of repetitions*the number of HARQ processes*the number of bits consumed by the HARQ-ACK of each HARQ process. Besides, the HARQ-ACK information corresponding to the current group of PDSCH transmissions is located at the end of the HARQ-ACK codebook reported at this time.

Examples of the present disclosure provide a communication device, including: a transceiver, a memory, and a processor.

The processor is connected to the transceiver and the memory respectively, for controlling the transceiver to send and receive wireless signals by executing computer-executable instructions stored in the memory, and implementing the HARQ-ACK transmission method provided by any of the foregoing technical solutions. For example, at least one of the methods shown in FIG. 2, FIG. 3A, FIG. 3B, and FIGS. 6 to 8 may be performed.

Examples of the present disclosure provide a computer non-transitory storage medium. The computer non-transitory storage medium stores computer-executable instructions. After the computer-executable instructions are executed by a processor, the HARQ-ACK transmission method provided by any of the foregoing technical solutions is performed. For example, at least one of the methods shown in FIG. 2, FIG. 3A, FIG. 3B, and FIG. 6 to FIG. 8 is performed.

Figure 11:
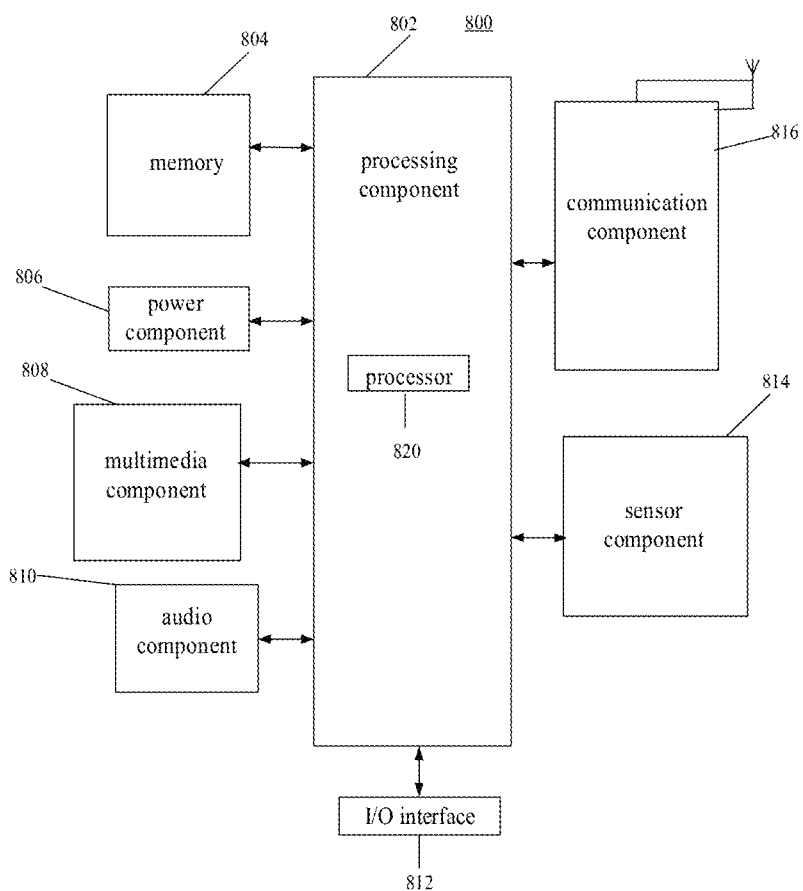
FIG. 11 is a schematic structural diagram of a UE according to an example of the present disclosure.

FIG. 11 shows a UE according to an example. The UE may be a mobile phone, a computer, a digital broadcast UE, a messaging device, a game console, a tablet device, a medical device, a fitness device, a personal digital assistant, and the like.

With reference to FIG. 11, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the UE 800, such as operations associated with display, phone call, data communication, camera operation, and recording operation. The processing component 802 may include one or more processors 820 to execute instructions to perform all or some of the steps of the methods described above. Additionally, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operations at UE 800. Examples of such data include instructions for any application or method running on the UE 800, contact data, phonebook data, messages, pictures, videos, and the like. The memory 804 may be implemented by any type of volatile or nonvolatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 806 provides power to various components of UE 800. The power component 806 may include a power management system, one or more power sources, and other components associated with generating, managing, and distributing power to UE 800.

The multimedia component 808 includes a screen that provides an output interface between UE 800 and the user. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may sense not only the boundaries of a touch or swipe action, but also the duration and pressure associated with the touch or swipe action. In some examples, the multimedia component 808 includes a front camera and/or a rear camera. When the UE 800 is in an operation mode, such as a shooting mode or a video mode, the front camera and/or the rear camera may receive external multimedia data. Each of the front and rear cameras may be a fixed optical lens system or have a focal length and the optical zooming capability.

The audio component 810 is configured to output and/or input audio signals. For example, the audio component 810 includes a microphone (MIC). The microphone is configured to receive an external audio signal when the UE 800 is in an operation mode, such as call mode, recording mode, and voice recognition mode. The received audio signal may be further stored in the memory 804 or transmitted via the communication component 816. In some examples, the audio component 810 also includes a speaker for outputting audio signals.

The I/O interface 812 provides an interface between the processing component 802 and peripheral interface modules, which may be keyboards, click wheels, buttons, and the like. These buttons may include, but are not limited to, home button, volume button, start button, and lock button.

The sensor component 814 includes one or more sensors for providing UE 800 with various aspects of status assessment. For example, the sensor component 814 may detect the on/off state of the UE 800, the relative positioning among components, such as the display and keypad of the UE 800. The sensor component 814 may also detect the position change of the UE 800 or a component of the UE 800, presence or absence of contact with UE 800 by the user, orientation or acceleration/deceleration of the UE 800 and temperature change of the UE 800. The sensor component 814 may include a proximity sensor, configured to detect the presence of nearby objects in the absence of any physical contact. The sensor component 814 may also include a light sensor, such as a CMOS or CCD image sensor, for use in imaging applications. In some examples, the sensor component 814 may also include an acceleration sensor, a gyroscope sensor, a magnetic sensor, a pressure sensor, or a temperature sensor.

The communication component 816 is configured to facilitate wired or wireless communications between the UE 800 and other devices. The UE 800 may access a wireless network based on a communication standard, such as Wi-Fi, 2G or 3G, or a combination thereof. In one example, the communication component 816 receives broadcast signals or broadcast related information from an external broadcast management system via a broadcast channel. In one example, the communication component 816 also includes a near field communication (NFC) module to facilitate short-range communication. For example, the NFC module may be implemented based on radio frequency identification (RFID) technology, infrared data association (IrDA) technology, ultra-wideband (UWB) technology, bluetooth (BT) technology and other technologies.

In an example, the UE 800 may be implemented by one or more application specific integrated circuit (ASIC), a digital signal processor (DSP), a digital signal processing device (DSPD), a programmable logic device (PLD), a field programmable gate array (FPGA), a controller, a microcontroller, a microprocessor or other electronic component implementations for performing the above method.

In an example, there is also provided a non-transitory computer-readable storage medium containing instructions, such as a memory 804 containing instructions. The instructions are executable by the processor 820 of the UE 800 to perform the above method. For example, the non-transitory computer-readable storage medium may be ROM, random access memory (RAM), CD-ROM, magnetic tape, floppy disk, optical data storage device, and the like.

Figure 12:
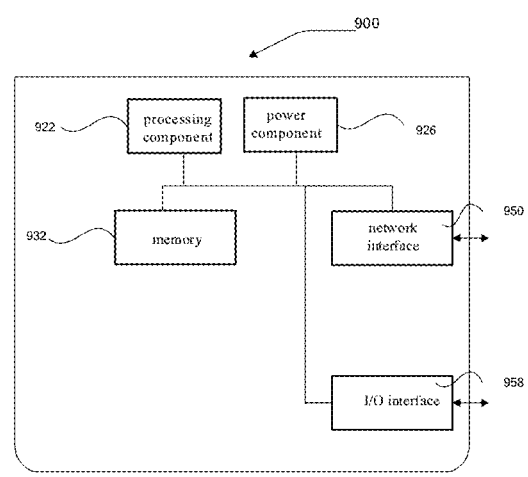
FIG. 12 is a schematic structural diagram of a base station according to an example of the present disclosure.

FIG. 12 is a schematic diagram of a base station. With reference to FIG. 12, the base station 900 includes the processing component 922, which further includes one or more processors, and a memory resource represented by the memory 932 for storing instructions executable by the processing component 922, such as application programs. The application program stored in the memory 932 may include one or more modules, each corresponding to a set of instructions. Furthermore, the processing component 922 is configured to execute the instructions to perform the HARQ-ACK information transmission method shown in FIG. 4 and/or FIG. 5.

The base station 900 may also include a power component 926 configured to perform power management of the base station 900, a wired or wireless network interface 950 configured to connect the base station 900 to a network, and an input output (I/O) interface 958. The base station 900 may operate based on an operation system stored in the memory 932, such as Windows Server™, Mac OS X™, Unix™, Linux™, Free BSD™ or the like.

Other examples of the present disclosure will readily occur to those skilled in the art upon consideration of the specification and practice of the content disclosed herein. The present disclosure is intended to cover any variations, uses, or adaptations of the present disclosure that follow the general principle of the present disclosure and include common general knowledge or techniques in the technical field not disclosed by the present disclosure. The specification and examples are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

Another aspect of the present disclosure provides an apparatus for triggering HARQ-ACK information transmission, which is applied to a base station. The apparatus includes: a first sending module, configured to send high-level signaling including a predetermined information field when a one-shot HARQ-ACK feedback mechanism is configured for a user equipment UE; and a first receiving module, configured to receive the same HARQ-ACK information for N times on N feedback occasions corresponding to the one-shot HARQ-ACK feedback mechanism, based on the number N of transmissions carried by the predetermined information field, where N is a positive integer.

Another aspect of the present disclosure provides an apparatus for triggering HARQ-ACK information transmission, which is applied to a UE. The apparatus includes: a second receiving module, configured to receive high-level signaling including a predetermined information field, where the high-level signaling is sent when the base station configures the UE to use a one-shot HARQ-ACK feedback mechanism; and a second sending module, configured to send the same HARQ-ACK information for N times on N feedback occasions corresponding to the one-shot HARQ-ACK feedback mechanism, based on the number N of transmissions carried by the predetermined information field, where N is a positive integer.

Another aspect of the present disclosure provides a computer non-transitory storage medium, wherein the computer non-transitory storage medium stores computer-executable instructions. After the computer-executable instructions are executed by a processor, the HARQ-ACK information transmission method provided by any technical solution of the foregoing first aspect or second aspect is implemented.

According to the technical solution provided by the present disclosure, when a one-shot HARQ-ACK feedback mechanism is configured for the UE, the HARQ-ACK information transmission fails for the first time, and any HARQ-ACK information transmission in the second to N-th times is successful, the base station may successfully receive the HARQ-ACK information uploaded by the UE. This reduces the phenomenon of data transmission errors caused by a single transmission failure of the HARQ-ACK information. N times transmissions of the same HARQ-ACK information are received at N feedback occasions. If the N feedback occasions are used, a diversity gain in the time domain may be obtained for one piece of HARQ-ACK information, thereby improving the transmission success rate for one piece of HARQ-ACK information.

The invention claimed is:

1. A hybrid automatic repeat request-acknowledgement (HARQ-ACK) information transmission method, comprising:
    sending, by a base station, high-level signaling comprising a predetermined information field, in response to determining that a one-shot HARQ-ACK feedback mechanism is configured for a user equipment (UE); and
    based on a number N of transmissions carried by the predetermined information field, receiving, by the base station, same HARQ-ACK information for N times on N feedback occasions corresponding to the one-shot HARQ-ACK feedback mechanism, wherein N is a positive integer,
    wherein in response to an interference signal strength of a Physical Uplink Control Channel (PUCCH) being greater than or equal to an interference threshold, a value of N is a positive integer greater than or equal to 2;
    in response to the interference signal strength of the PUCCH being less than the interference threshold, the value of N is a 1; and a HARQ-ACK codebook carrying the HARQ-ACK information comprises N sub-codebooks, wherein one of the sub-codebooks carries one piece of the HARQ-ACK information.

2. The method according to claim 1, further comprising:
sending an activation indication in response to determine that a repeated transmission of the HARQ-ACK information is to activate, wherein the activation indication is configured to trigger the UE to send the same HARQ-ACK information for N times based on the number of transmissions; and
sending a deactivation instruction in response to determine that the repeated transmission of the HARQ-ACK information is to deactivate, wherein the deactivation instruction is configured to instruct the UE to deactivate the repeated transmission of the HARQ-ACK information.

3. The method according to claim 2, wherein the activation indication or the deactivation indication is carried in medium access control MAC layer signaling.

4. The method according to claim 1, wherein an X-th transmission of one piece of the HARQ-ACK information is carried by a (N+1-X)-th sub-codebook of the HARQ-ACK codebook, wherein X is a positive integer less than or equal to N.

5. The method according to claim 4, wherein
when a number Y of pieces of the HARQ-ACK information to be sent is less than N, a first sub-codebook to a (N−Y)-th sub-codebook of the HARQ-ACK codebook carry a predetermined bit sequence.

6. The method according to claim 1, wherein
when a number Y of pieces of the HARQ-ACK information to be sent is less than N, a first sub-codebook to a (N-Y)-th sub-codebook of the HARQ-ACK codebook carry a predetermined bit sequence, wherein Y is a positive integer.

7. The method according to claim 1, wherein a number of bits comprised in the HARQ-ACK codebook is $N*N_{ID}*BofPerID$, wherein $N_{ID}$ is a number of HARQ processes, BofPerID is a number of bits occupied by the HARQ-ACK information of one of the HARQ processes, and a number of bits of one of the sub-codebooks is $N_{ID}*BofPerID$.

8. A hybrid automatic repeat request-acknowledgement (HARQ-ACK) information transmission method, comprising:
receiving, by a user equipment (UE), high-level signaling comprising a predetermined information field, wherein the high-level signaling is sent when a one-shot HARQ-ACK feedback mechanism is configured by a base station for the UE; and
based on a number N of transmissions carried by the predetermined information field, sending, by the UE, same HARQ-ACK information for N times on N feedback occasions corresponding to the one-shot HARQ-ACK feedback mechanism, wherein N is a positive integer,
wherein in response to an interference signal strength of a Physical Uplink Control Channel (PUCCH) being greater than or equal to an interference threshold, a value of N is a positive integer greater than or equal to 2;
in response to the interference signal strength of the PUCCH being less than the interference threshold, the value of N is a 1; and
a HARQ-ACK codebook carrying the HARQ-ACK information comprises N sub-codebooks, wherein one of the sub-codebooks carries one piece of the HARQ-ACK information.

9. The method according to claim 8, further comprising:
receiving an activation instruction; and wherein
sending the same HARQ-ACK information for N times on N feedback occasions corresponding to the one-shot HARQ-ACK feedback mechanism based on the number N of transmissions carried by the predetermined information field comprises:
after a repeated transmission of the HARQ-ACK information is activated by the activation indication, sending the same HARQ-ACK information for N times on N feedback occasions corresponding to the one-shot HARQ-ACK feedback mechanism, based on the number N of transmissions carried by the predetermined information field.

10. The method according to claim 9, further comprising:
receiving a deactivation instruction; and
in response to determining that the deactivation indication is received, sending one piece of the HARQ-ACK information once on one feedback occasion corresponding to the one-shot HARQ-ACK feedback mechanism.

11. The method according to claim 8, wherein an X-th transmission of one piece of the HARQ-ACK information is carried by a (N+1−X)-th sub-codebook of the HARQ-ACK codebook, wherein X is a positive integer less than N.

12. The method according to claim 11, wherein
when a number Y of pieces of the HARQ-ACK information to be sent is less than N, a first sub-codebook to a (N−Y)-th sub-codebook of the HARQ-ACK codebook carry a predetermined bit sequence.

13. The method according to claim 8, wherein
when a number Y of pieces of the HARQ-ACK information to be sent is less than N, a first sub-codebook to a (N-Y)-th sub-codebook of the HARQ-ACK codebook carry a predetermined bit sequence.

14. The method according to claim 8, wherein a number of bits comprised in the HARQ-ACK codebook is $N*N_{ID}*BofPerID$, wherein $N_{ID}$ is a number of HARQ processes, BofPerID is a number of bits occupied by the HARQ-ACK information of one of the HARQ processes, and a number of bits of one of the sub-codebooks is $N_{ID}*BofPerID$.

15. A communication device, comprising:
a transceiver;
a memory; and
a processor, respectively connected to the transceiver and the memory, for controlling the transceiver to transmit and receive a signal wirelessly by executing computer-executable instructions stored in the memory, and implementing the method according to claim 8.

16. The communication device according to claim 15, wherein
the method further comprises: receiving an activation instruction; and
sending the same HARQ-ACK information for N times on N feedback occasions corresponding to the one-shot HARQ-ACK feedback mechanism based on the number N of transmissions carried by the predetermined information field, comprises:
after a repeated transmission of the HARQ-ACK information is activated by the activation indication, sending the same HARQ-ACK information for N times on N feedback occasions corresponding to the one-shot HARQ-ACK feedback mechanism, based on the number N of transmissions carried by the predetermined information field.

17. A communication device, comprising:
a transceiver;
a memory; and
a processor, respectively connected to the transceiver and the memory, for controlling the transceiver to transmit and receive a signal wirelessly by executing computer-executable instructions stored in the memory, and implementing a hybrid automatic repeat request-acknowledgement HARQ-ACK information transmission method, comprising:
sending high-level signaling comprising a predetermined information field, in response to determining that a one-shot HARQ-ACK feedback mechanism is configured for a user equipment UE; and
based on a number N of transmissions carried by the predetermined information field, receiving same HARQ-ACK information for N times on N feedback occasions corresponding to the one-shot HARQ-ACK feedback mechanism, wherein N is a positive integer,
wherein in response to an interference signal strength of a Physical Uplink Control Channel (PUCCH) being greater than or equal to an interference threshold, a value of N is a positive integer greater than or equal to 2;
in response to the interference signal strength of the PUCCH being less than the interference threshold, the value of N is a 1; and
a HARQ-ACK codebook carrying the HARQ-ACK information comprises N sub-codebooks, wherein one of the sub-codebooks carries one piece of the HARQ-ACK information.

18. The communication device according to claim 17, wherein the method further comprises:
sending an activation indication in response to determine that a repeated transmission of the HARQ-ACK information is to activate, wherein the activation indication is configured to trigger the UE to send the same HARQ-ACK information for N times based on the number of transmissions; and
sending a deactivation instruction in response to determine the repeated transmission of the HARQ-ACK information is to deactivate, wherein the deactivation instruction is configured to instruct the UE to deactivate the repeated transmission of the HARQ-ACK information.

* * * * *